United States Patent [19]

Weir et al.

[11] Patent Number: 4,900,616
[45] Date of Patent: Feb. 13, 1990

[54] PHENOLIC FOAM ROOF INSULATION OF IMPROVED DIMENSIONAL STABILITY

[75] Inventors: Charles R. Weir, Sarnia; Paul E. Metcalfe, Corunna, both of Canada

[73] Assignee: Fiberglas Canada, Inc., Willowdale, Canada

[21] Appl. No.: 358,802

[22] Filed: May 31, 1989

[51] Int. Cl.$^4$ .............................................. B32B 3/26
[52] U.S. Cl. ............................... 428/316.6; 156/307.3; 428/317.1; 428/317.7
[58] Field of Search .................. 156/307.3; 428/304.4, 428/314.4, 314.8, 316.6, 317.1, 317.7

[56] References Cited

U.S. PATENT DOCUMENTS

| | | | |
|---|---|---|---|
| 4,019,938 | 4/1977 | Forrester | 156/78 |
| 4,048,145 | 9/1977 | Moss | 528/155 |
| 4,101,465 | 7/1978 | Lockwood et al. | 521/118 |
| 4,121,958 | 10/1978 | Koonts | 156/79 |
| 4,204,019 | 5/1980 | Parker | 156/79 |
| 4,227,356 | 10/1980 | Stern et al. | 52/309.4 |
| 4,335,218 | 6/1982 | DeGuiseppi | 521/99 |
| 4,357,377 | 11/1982 | Yamamoto | 428/40 |
| 4,366,204 | 12/1982 | Briggs | 428/304.4 |
| 4,374,687 | 2/1983 | Yamamoto | 156/71 |
| 4,501,794 | 2/1985 | Blackwell et al. | 428/316.6 |
| 4,513,045 | 4/1985 | Bondoc et al. | 428/137 |
| 4,695,501 | 9/1987 | Robinson | 428/159 |
| 4,764,420 | 8/1988 | Gluck et al. | 428/317.7 |

FOREIGN PATENT DOCUMENTS

| | | |
|---|---|---|
| 712133 | 6/1965 | Canada . |
| 721719 | 11/1965 | Canada . |
| 772350 | 11/1967 | Canada . |
| 778545 | 2/1968 | Canada . |
| 834124 | 2/1970 | Canada . |
| 927730 | 6/1973 | Canada . |
| 981169 | 6/1976 | Canada . |
| 1078722 | 6/1980 | Canada . |
| 1146331 | 5/1983 | Canada . |
| 1243256 | 10/1988 | Canada . |
| 2137704 | 2/1973 | Fed. Rep. of Germany . |

Primary Examiner—William J. Van Balen
Attorney, Agent, or Firm—Nixon & Vanderhye

[57] ABSTRACT

Laminar insulating foam roofing material (e.g. phenolic resin foam) having improved dimensional stability and which resists warpage when hot asphalt is applied to one surface thereof during installation, is disclosed. A flexible web material such as Kraft paper is bonded to opposing surfaces of the foam material by means of a uniform asphalt coating applied to one surface of the web material, the asphalt being a "sandwich" layer between the insulating foam material and said web material. This material is made by the steps of: (a) forwardly advancing the aforesaid laminar insulating foam material between a pair of opposed rolls; and (b) simultaneously applying a predetermined quantity of a heat absorbing and bonding material to surfaces of two flexible webs on opposing sides of said laminar foam material and bringing said two flexible webs each of which has a coating of said heat absorbing and bonding material applied to a surface thereof, into contact with said opposing surfaces of said laminar foam material at said opposed rolls, such that after said bringing into contact of the insulating foam material and coated web material, said materials bond together to form said assembly.

11 Claims, 3 Drawing Sheets

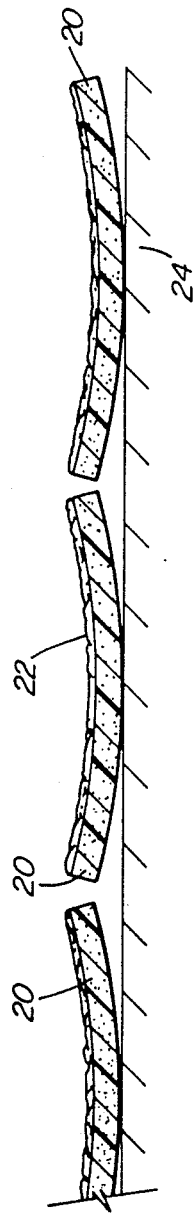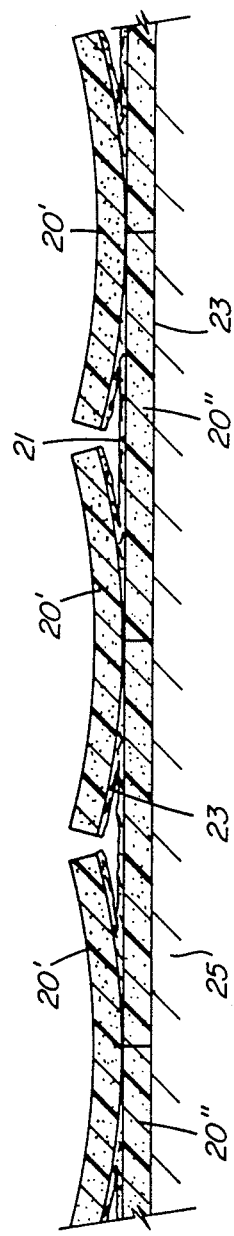
FIG. IA
FIG. IB

PHENOLIC FOAM ROOF INSULATION OF IMPROVED DIMENSIONAL STABILITY

The present invention relates generally to laminar insulating foam material, and more particularly relates to laminar phenolic foam roof insulating material which has improved dimensional stability and in particular has the ability to resist warpage when hot asphalt is applied to one surface thereof during installation.

Phenolic foams have been found to be excellent roof insulating materials, having many desirable properties. However, it has been discovered that phenolic foam roof insulations have a tendency to warp when hot asphalt is applied during installation. This hot asphalt is used to adhere and seal layers of roofing felts over the insulation to provide a waterproof membrane. Since this hot asphalt is applied to only one side of the phenolic insulation at a time it creates unbalanced stresses on one side relative to the other which then causes the board to warp. As the asphalt cools the phenolic foam board is then held in a permanently warped condition. This warp may be induced by thermal expansion of the hot asphalt-topped surface or due to shrinkage of the surface as a result of drying or curing of the phenolic resin. The board warpage may be either concave or convex depending upon such factors as how many layers of phenolic foam boards are bonded in the roof assembly, time between asphalt applications, etc.

Reference is made to FIGS. 1a and 1b of the attached drawings which are sketches illustrating the manner in which an insulating foam board by itself would warp, in both a single layer roof installation and a double layer roof installation, following application of hot asphalt to one surface of the foam board attached to a roof.

In FIG. 1a, boards 20 of insulating phenolic foam material which do not have any facing material on their surfaces, are shown, as a single layer, after application of a hot asphalt coating 22 to the boards' upper surfaces after installation of the insulating boards to a roof, a portion of which is shown as 24. The hot asphalt coating transmits heat energy to the phenolic foam boards 20, and differences in temperature between different areas of the foam boards induce unbalanced thermal stresses in one side of the boards relative to the other which then cause the boards to warp.

As shown in FIG. 1a, shrinkage of the top surface of the foam boards causes warpage.

FIG. 1b of the attached drawings illustrates the manner in which warpage of a double layer of phenolic foam boards (20', 20''), the bottom surface 23 of which double layer is adhered (as by a suitable adhesive) or mechanically fastened to a roof deck 25, may occur. The top layer (20') of foam boards is joined to the bottom layer (20'') of foam boards by a layer of asphalt 21. The heat of hot asphalt (21) between the layers of boards causes warpage of the top boards (20') to occur, due to thermal expansion. The heat of the asphalt is dissipated slowly due to insulating properties of the top and bottom layers of the boards. Upon cooling of the asphalt the boards tend to flatten out.

Warpage of the foam boards can be either concave (as shown in FIGS. 1a and 1b) or convex, dependent upon such factors as the number of layers of phenolic foam boards which are bonded to the roof, time between asphalt applications, etc., as previously stated.

A number of approaches have been taken towards solving the problem of warpage of phenolic foam insulating material which occurs after installation on a roof and subsequent covering with hot asphalt and roofing felts. For instance, various facings have been placed on the insulating phenolic foam boards, on the surface which is to be expose to the hot asphalt coating. For example, such material as glass mat, glass reinforced tissue and corrugated paper have been used as facing materials for this purpose, but only with limited success. See, for example, U.S. Pat. No. 4,227,356 of Stern et al., dated Oct. 14, 1980; Canadian Patent No. 1,146,331, Stern and Vines, issued May 17, 1983; and U.S. Pat. No. 4,357,377, Yamamoto, issued Nov. 2, 1982.

While the use of an asphalt-kraft paper facing on a roof insulation product is generally known, it is believed that our discovery that by applying the kraft paper and asphalt coating simultaneously to both sides of an insulating foam slab or board material the laminated product does not warp during the facing operation or when it is being installed on a roof using hot asphalt, is novel. Organic foams, because of their very nature, tend to warp when exposed to heat; but by applying an equal heat load on both surfaces at one time, we have found that no warping of the roof insulation product occurs during preparation of the laminate. Furthermore, it has been found that when hot asphalt is being applied to one surface of the insulating foam board when in place on a roof, the warpage that is normally encountered with an unfaced insulating foam board does not occur.

It has been discovered, therefore, in accordance with the present invention, that warpage of the insulating foam material can be substantially prevented under these circumstances by facing both sides of the laminar insulating foam material, e.g. a board, slab or sheet of such material, with a flexible web material such as paper, and more particularly, Kraft paper, to which a substantially uniform coating of a heat absorbing and bonding material has been applied, on the surface thereof facing the foam material. The heat absorbing and bonding material preferably is asphalt; however any suitable adhesive material can be used for this purpose as long as it has heat absorbing properties. It has been found that the asphalt and paper-faced surfaces of the laminar foam material act as a heat sink which tends to equalize the heat load on both sides of the foam board and which thus minimizes stresses on the foam material due to temperature differentials therein which arise when a hot coating material (e.g. hot asphalt) is applied to one surface of the insulating foam material.

As hot asphalt is applied to one asphalt and Kraft paper-faced surface, during the course of installation of the phenolic foam boards, to a roof, an equalization of the heat load tends to occur, thus reducing thermal stresses on the foam material caused by varying amounts of heat energy transmitted to the phenolic foam core. This results in the foam insulating material having increased flexural strength and, as an added benefit, an improvement in performance of the foam roof insulating material with respect to breaking load, wind uplift and flute span deflection which are common tests of roofing components systems. It has also been found that warpage of the phenolic foam insulation during installation is substantially prevented.

BRIEF DESCRIPTION OF THE DRAWINGS

FIGS. 1a and 1b are sketches illustrating the manner in which a foam insulating board by itself would warp, in both a single layer roof installation and a double layer roof installation, following application of a hot asphalt coating to one surface of the foam board.

SUMMARY OF THE INVENTION

The present invention, in one aspect, resides, broadly, in a method of making an assembly comprising a laminar insulating foam material to opposing surfaces of which are bonded a flexible web material by means of a heat absorbing and bonding material coated on one surface of said flexible web material, said assembly having enhanced dimensional stability and being resistant to warpage when a hot coating material is applied to one surface thereof, said method comprising the steps of:

(a) moving said laminar insulating foam material forwardly between a pair of opposed rolls; and (b) simultaneously applying a predetermined quantity of a heat absorbing and bonding material to surfaces of two flexible webs on opposing sides of said laminar foam material and bringing said two flexible webs each of which has a coating of said heat absorbing and bonding material applied to a surface thereof, into contact with said opposing surfaces of said laminar foam material at said opposed rolls, such that after said bringing into contact of the insulating foam material and coated web material, said materials bond together to form said assembly.

More particularly, the invention resides in a method as described above, in which the predetermined quantity of heat absorbing and bonding material is simultaneously applied to surfaces of said flexible webs advancing toward contact with said forwardly moving laminar foam material, said web surfaces to which the heat absorbing and bonding material is applied being those surfaces which will come into contact with said laminar foam material. The preferred heat absorbing and bonding material used in this method is asphalt, the preferred flexible web material is Kraft paper, and the preferred insulating foam material is phenolic foam.

The present invention, in another aspect, resides in an assembly comprising a laminar insulating foam material the opposing surfaces of which are covered with a facing material consisting essentially of a flexible web material substantially uniformly coated on one surface thereof with a heat absorbing and bonding material, said heat absorbing and bonding material being in contact with said insulating foam material, said facing material serving as a heat sink which minimizes thermal stresses in said laminar insulating foam material due to temperature differentials in said foam material when a hot coating material is applied to one surface thereof, and thereby imparting increased flexural strength to said foam material, said assembly being resistant to warpage when said hot coating material is applied to one surface thereof.

Figure 2:
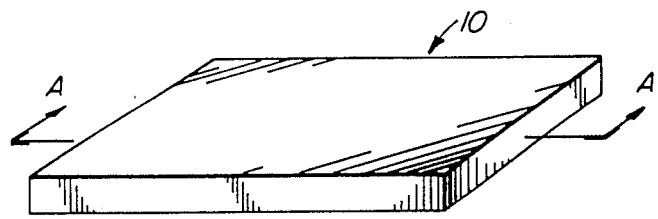
FIG. 2 is a perspective view of a foam insulating board faced with asphalt and Kraft paper on two surfaces thereof, in accordance with the present invention.
Figure 3:
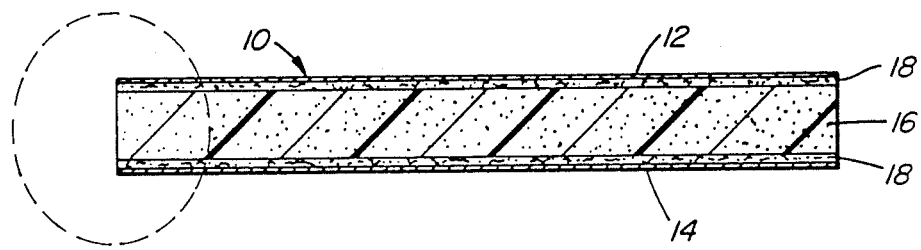
FIG. 3 is a cross-sectional view of the product shown in FIG. 2, taken along line A—A thereof.

The product according to a preferred embodiment of the present invention, as illustrated in FIGS. 2 and 3 of the drawings, is an insulating phenolic foam board 10 faced on both surfaces with a facing material (12, 14) which may be any flexible web material, but preferably is paper and most preferably is Kraft paper; and this facing material is laminated to the phenolic foam core 16 by a suitable heat absorbing and bonding material 18, which is preferably asphalt but can be any suitable heat absorbing adhesive. The faced surfaces of foam board 10 reduce the heat energy transmitted to phenolic foam core 16 from a hot asphalt coating applied to one surface of board 10 during installation of the insulating material on a roof. This reduces unbalanced thermal stresses in one side of the foam board relative to the other, which stresses tend to cause warpage of the boards during installation on a roof, (as shown in FIGS. 1a and 1b). The facings on opposite surfaces of foam board 10 thus impart increased rigidity and flexural strength to the board, and render the boards resistant to warpage when a hot asphalt coating is applied to one surface thereof. At the same time the facings provide an excellent bonding surface for application of subsequent roofing materials such as roofing felts. The products of the present invention also have enhanced resistance to wear and tear, and to roof traffic such as wheelbarrows, motorized asphalt applicators and the like, as well as improving its in-service performance.

Figure 4:
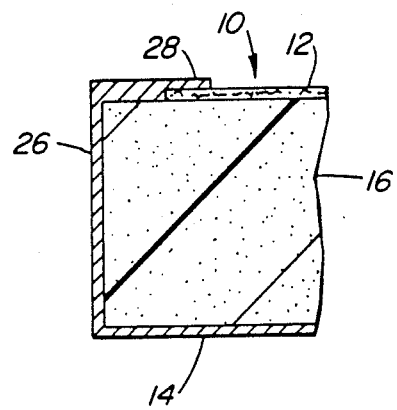
FIG. 4 is an enlarged detail of one end (as illustrated by the circle in dashed lines) of the foam insulating board faced with asphalt and Kraft paper, as shown in cross-section in FIG. 3.

In a preferred embodiment of the invention, as shown in FIG. 4, facing material such as that shown as 12 or 14 in FIG. 3, comprising a uniform asphalt coating 18 applied to one surface of Kraft paper, is wrapped around at least one edge of foam board 10. As an example, a continuation of bottom facing layer 14 (FIGS. 3, 4) may be wrapped around one edge of foam board 10 as facing layer 26, and its end lapped over top facing layer 12, as shown at 28. Both edges of the foam board may be similarly wrapped with the facing material, if desired.

Figure 5:
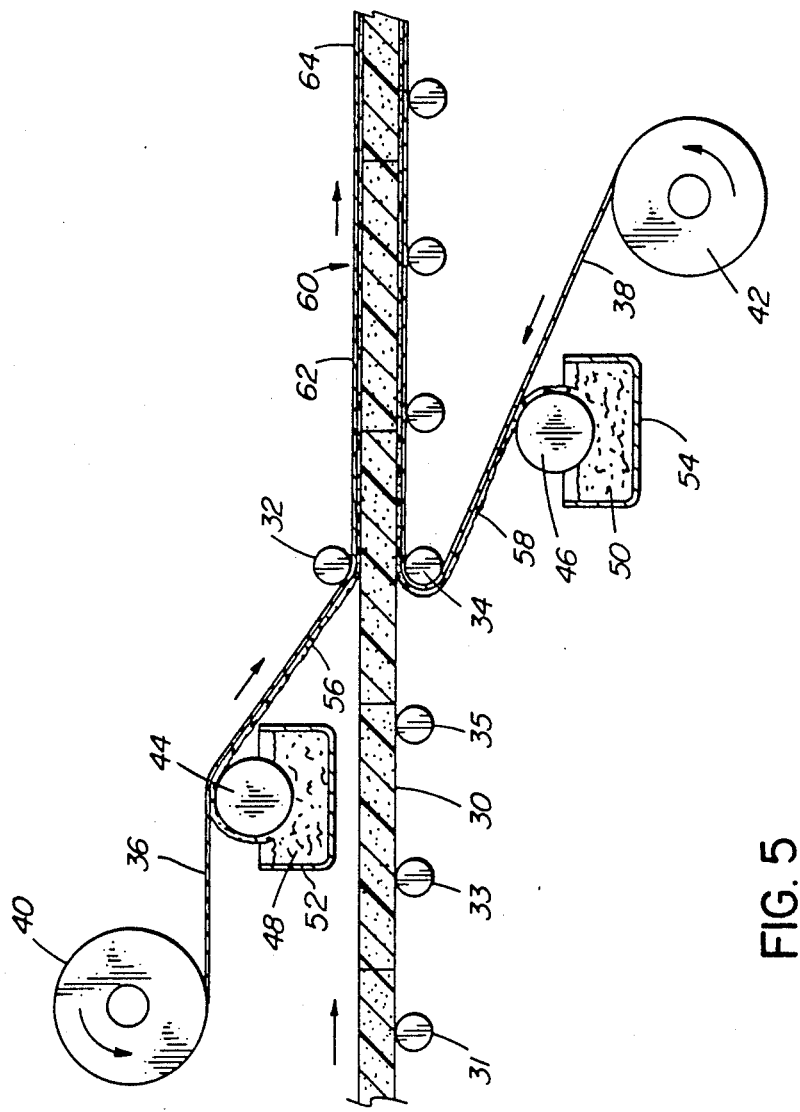
FIG. 5 is an illustration of the lamination process in accordance with one aspect of the present invention.

The process for producing the above-described product will now be described, with reference to FIG. 5 of the drawings. Laminar insulating foam material such as foam boards or slabs 30, which are either with or without a preliminary facing, are moved forwardly (as shown by the arrows) over rolls (31, 33, 35) and pass between a pair of opposed nip rolls 32, 34. Simultaneously with the forward movement of the insulating foam boards two webs 36, 38 of a suitable flexible web material, preferably Kraft paper, are fed from supply rolls 40, 42 disposed on opposite sides of the forwardly advancing foam material. Webs 36 and 38 pass over applicator rolls 44, 46 respectively, which applicator rolls are positioned such that a part of each of these rolls is in contact with hot asphalt (48, 50) within a suitable asphalt container such as a tank (52, 54). As each of the webs 36 and 38 pass over its respective applicator rolls (44, 46) a precisely metered quantity of hot asphalt (56, 58) is uniformly applied to one surface of the forwardly moving web, at a precisely controlled temperature. The application of the hot asphalt to the respective webs occurs simultaneously. The forwardly moving webs 36, 38, with the asphalt applied to one surface thereof as illustrated at 56, 58, respectively in FIG. 5, now pass over opposed rolls 32, 34 and simultaneously contact the forwardly moving foam board 30 at this point. The asphalt coating bonds webs 36, 38 to the top and bottom surfaces of foam board 30 to form the laminated foam board product 60, this bonding occurring simultaneously on both the top and bottom surfaces of the board (as at points 62 and 64) so as to balance thermal stresses in the foam board. In a specific example of the process of this invention, 9 ft. pieces of tissue-faced phenolic resin foam are fed into the laminating apparatus previously described and the asphalt and Kraft paper facing is applied as described hereinabove and illustrated in FIG. 5. The laminated product 60 may be severed at any desired points therealong to form boards of predetermined length; and if desired, the facing material applied to the foam board, including facing and bonding agent (56, 58) may be wrapped around one or both edges of the board which has been severed from laminated product 60, onto the opposite face thereof.

While a preferred embodiment of the present invention has been specifically described herein, it will be apparent to those skilled in the art that various modifications and embodiments of the invention are possible within the ambit and scope thereof. It is our intention, therefore, that this invention not be limited to what has been specifically described hereinabove, but only by what is specifically set forth in the claims which follow.

What is claimed is:

1. A method of making an assembly comprising a laminar insulating foam material to opposing surfaces of which are bonded a flexible web material by means of a substantially uniform layer of a heat absorbing and bonding material coated on one surface of said flexible web material, said assembly having enhanced dimensional stability and being resistant to warpage when a hot coating material is applied to one surface thereof, said method comprising the steps of:
   (a) moving said laminar insulating foam material forwardly between a pair of opposed rolls; and
   (b) simultaneously applying a predetermined quantity of a heat absorbing and bonding material to surfaces of two flexible webs on opposing sides of said laminar foam material and bringing said two flexible webs each of which has a coating of said heat absorbing and bonding material applied to a surface thereof, into contact with said opposing surfaces of said laminar foam material at said opposed rolls, such that after said bringing into contact of the insulating foam material and coated web material, said materials bond together to form said assembly.

2. A method in accordance with claim 1 wherein said predetermined quantity of heat absorbing and bonding material is simultaneously applied to surfaces of said flexible webs advancing toward contact with said forwardly moving laminar foam material, said web surfaces to which the heat absorbing and bonding material is applied being those surfaces which will come into contact with said laminar foam material.

3. A method according to claim 1 or claim 2 wherein said heat absorbing and bonding material is asphalt.

4. A method according to claim 1 or claim 2 wherein said flexible web material is Kraft paper.

5. A method according to claim 1 or claim 2 wherein the insulating foam material is a phenolic foam material.

6. A method according to claim 1 or claim 2, further comprising wrapping said web material, to said one surface of which the heat absorbing and bonding material has been applied, around at least one edge of said laminar insulating foam material.

7. An assembly comprising a laminar insulating foam material the opposing surfaces of which are covered with a facing material consisting essentially of a flexible web material substantially uniformly coated on one surface thereof with a heat absorbing and bonding material, said heat absorbing and bonding material being in contact with said insulating foam material, said facing material serving as a heat sink which minimizes thermal stresses in said laminar insulating foam material due to temperature differentials in said foam material when a hot coating material is applied to one surface thereof, and thereby imparting increased flexural strength to said foam material, said assembly being resistant to warpage when said hot coating material is applied to one surface thereof.

8. An assembly according to claim 7 wherein the insulating foam material is a phenolic foam material.

9. An assembly according to claim 7 or claim 8 wherein the heat absorbing and bonding material is asphalt.

10. An assembly according to claim 7 or claim 8 wherein the flexible web material is paper.

11. An assembly according to claim 7 or claim 8 wherein the opposing surfaces of a phenolic resin foam board are covered with a facing material which consists essentially of Kraft paper one surface of which is substantially uniformly coated with asphalt, the asphalt bonding said Kraft paper to the opposing surfaces of said phenolic resin foam board.

* * * * *